Dec. 17, 1968   R. W. ROBBINS   3,416,379
STATICALLY SEALED GYRATING LEVER TRANSMISSION
Filed May 31, 1967
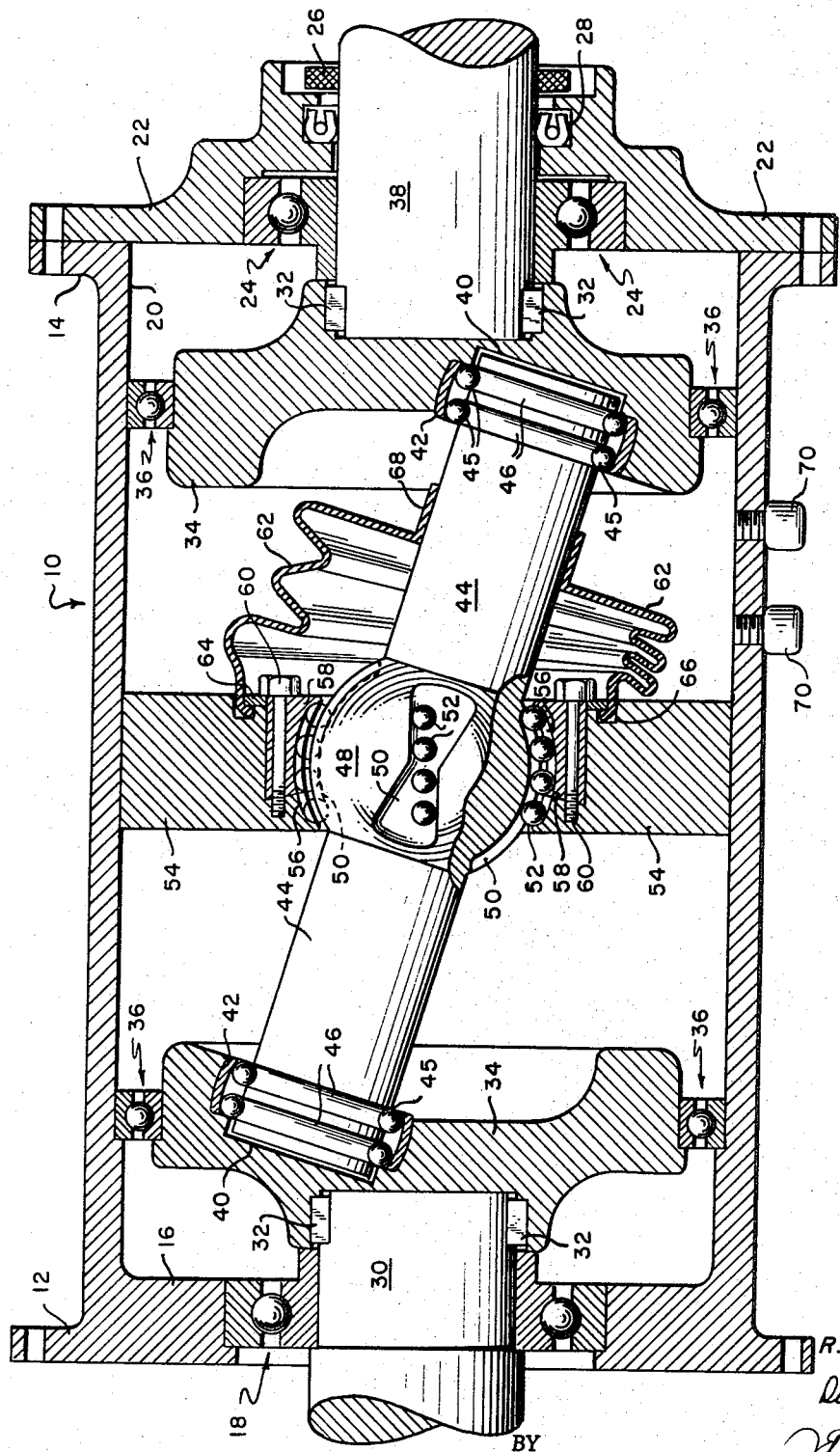
INVENTOR
R. W. ROBBINS
Rosa McGidlaw
AGENT
Hodges
ATTORNEY

United States Patent Office 3,416,379
Patented Dec. 17, 1968

3,416,379
STATICALLY SEALED GYRATING LEVER
TRANSMISSION
Roland W. Robbins, 93 Church Road,
Arnold, Md. 21012
Filed May 31, 1967, Ser. No. 643,322
7 Claims. (Cl. 74—18.1)

ABSTRACT OF THE DISCLOSURE

A gyrating lever device, for transmission of rotary power through a water-tight bulkhead, including improvements to a spherical joint containing a set of ball bearings which permits gyrating motion but precludes rotary motion of the gyrating lever. A static seal in the form of bellows is providing to positively stop communication of fluids through the bearing from one side to the other.

---

The invention described herein may be manufactured and used by or for the Government of the United States of America for governmental purposes without the payment of any royalties thereon or therefor.

Background of the invention

The present invention relates to improvements to gyrating lever devices for transmission of rotary power through water-tight bulkheads and more particularly to the spherical-joint bearing means which will restrict all rotary motion yet permit gyrating motion of the gyrating lever, and further contemplates the use of rubber or metallic bellows attached statically to the gyrating lever and its housing and thus precludes communication of fluids from one side to the other of the bearing.

In the field of transmission of rotary motion through bulkheads, the means used has been generally a rotating shaft having about its periphery some type of gasket packing material which is generally a resilient material which contacts the rotating shaft and the shaft housing in a sealing relationship. This method is referred to as a dynamic seal as there is obviously a relative motion between the shaft and the sealing material. When the dynamic sealing arrangement is utilized in ships and submersible vehicles for hull penetration of the propeller and control surface shafts, obvious disadvantages result. It is almost impossible to preclude the ingress of seawater particularly in submersible vehicle where the outside seawater pressure is great. Even though the seal material itself may be resistant to the harmful effects of the seawater nevertheless silt, sand, and other patriculate inclusions in the water may work their way between the seal and the rotating member or shaft where they will create an abrasive action harmful to both the seal material and the rotating member or shaft.

The prior art shows attempts to eliminate the dynamic type seal and these attempts are exemplified in gyrating lever type transmission devices which will transmit rotary motion through a bulkhead and use a static seal. A static seal may be described as one in which there is no relative motion between the moving member and the seal material. While the use of gyrating transmissions have eliminated the problems associated with the rotating dynamic seals, problems have arisen in the means for permitting gyrating motion yet eliminating rotary motion of the gyrating lever. Generally, spherical joints, intermediate the ends of the gyrating lever, have been provided which are sometimes further provided with ball bearings to eliminate torque. Hence other external means such as metal bellows securely affixed to the gyrating lever and to the housing must be provided to eliminate rotation. The disadvantage of this arrangement is that at high speeds, the metal bellows readily rupture through the action of metal fatigue. Another method of permitting gyration yet eliminating rotation is to loosely pin the gyrating lever transversely through these spherical joints, and thus this method is suitable only for low speed operation.

Summary

The instant invention relating particularly to improvements to the spherical joint, solves the aforementioned problems of the prior art relating to gyrating lever transmissions having spherical joints. The problem of eliminating rotating motion yet permitting gyrating motion is solved by providing a spherical joint having ball bearings constrained in a number of grooves in the wall of the female spherical portion affixed to the housing and running parallel to the general axis of rotation. The male spherical portion of the spherical joint, intermediate the ends of the gyrating lever, contain an equal number of grooves having a configuration similar to a "bow-tie," the longitudinal axis thereof being parallel to the length of the gyrating lever. Thus the lever may gyrate but not rotate. Additionally since rotation is precluded by the novel ball-bearing feature in the spherical joint, no external constraining member such as pinning or metal bellows is required to restrain rotation motion and a flexible bellows material such as for example rubber may be used to eliminate leakage from one side of the gyrating lever to the other.

Accordingly it is the primary object of this invention to transmit relatively high power and speeds utilizing a gyrating lever arrangement.

Another object is to decrease friction in gyrating motion and eliminate rotating motion in the spherical joint of a gyrating lever transmission.

Still another object is to permit the use of static fluid seals to eliminate communication from one side to the other of the gyrating lever transmission.

Other objects and features of the invention will become apparent to those skilled in the art as the disclosure is made in the following detailed description of the preferred embodiment of the invention as illustrated in the accompanying sheet of drawing in which:

Brief description of the drawing

The figure is a view in section showing a gyrating lever in a housing, and particularly a preferred embodiment of the novel spherical bearing.

Description of the preferred embodiment

Referring now to the drawing there is shown in the figure a hollow substantially cylindrical housing or casing 10 having bolt flanges 12 and 14 in each end thereof. The input end (left end as viewed in the drawing) of the gyrating lever transmission casing has an integrally formed end piece 16 extending towards the axis thereby forming a partially closed end and is further provided with a conventional bearing bore to contain the outer race of a combination thrust and radial ball-bearing 18. At the output end (right end as viewed in the drawing) the inner bore of the casings 20 is opened to the full diameter to facilitate insertion of the component parts of the gyrating lever transmission. The output or open end is closed in a sealing relationship with a conventional end bell 22. This end bell is counterbored to provide a bearing bore for the outer race of the bearing 24 and for any variety of shaft to sealing means such as the O-ring type and the chevron type as designated by 26 and 28 respectively. This end-bell is further provided with bolt holes corresponding to the holes in the flange 14 of the casing for containing bolts (not shown). It is to be understood that throughout this specification the terms input and output end are used merely to facilitate reference to the drawing as their function may be readily reversed.

The input end of the gyrating lever transmission is provided with a shaft 30 which may be connected to any type of power means such as for example an electric motor. This shaft 30 extends through the inner race of the bearing 18 in line-to-line fit and terminates in one or more conventional key ways containing one or more keys 32. Affixed to the end of the shaft and locked against relatively rotary motion is a crank plate 34 supported for rotary motion by ball bearing 36 about the crank plate's periphery and contained within the inner bore of the casing 10.

Similarly at the output end of the casing an output shaft 38 extends through the shaft seals 26 and 28 and through the inner race of the bearing 24 in line-to-line fit and terminates in one or more key ways containing keys 32. Affixed to the end of this shaft 38 is another crank plate 34 supported for rotary motion by a ball bearing 36. Crank plates 34 are provided with identical gyrating lever cavities 40 which contain the spherical outer race of a double row ball bearings 42. Each outer extremity of the gyrating lever 44 is provided with integrally ground grooves acting as races for the balls of the double rows spherical bearing 42.

Intermediate the extremities of the lever is provided integrally formed enlarged spherical portion 48. Equally angularly spaced about the periphery of the spherical protuberance 48 are provided indentations 50, the floor of which are spherically shaped and concentric with the enlarged spherical portion 48. These indentations 50 have a generalized shape of a "bow-tie" the major dimension of which is parallel to the axis of the gyrating lever 44. The depth of the indentation 50 is one-third to one-half the diameter of the balls 52 and provide a bearing race or surface therefor. The purpose of the "bow-tie" configuration is to permit gyrating motion yet limit rotating motion of the gyrating lever 44.

About the spherical enlargement of the gyrating lever, there is provided a spherical bearing support 54 extending outwardly to engage the inner bore of the casing 10. This "donut" shaped support 54 is provided at the inner diameter thereof with a concave spherical shaped bore which is further provided with a plurality of arcuate grooves being a segment of a circle 56, the chords of which are parallel to the axis of the casing 10. These grooves in the support plate are one-third to one-half the diameter of the balls thus providing an outer race for the gyrating lever's spherical joint. To facilitate assembly, a segment ring 58 containing a portion of the concave spherical shaped bore may be provided in a counter bore of the support 54 and secured with bolts 60.

To preclude communication from one side of the spherical joint to the other, and to protect the spherical joint from foreign matter there is provided a static seal in the form of a corrugated rubber or metallic boot 62 which is secured in sealing relationship and in annular groove 66 provided in the support 54 by a clamp ring 64 secured by bolts 60. The outer end of the boot is provided with a collar 68 which is stretched into sealing relationship with the output end of the gyrating lever 44.

The output end of the gyrating lever casing may be provided with tube joints 70 to permit pressurization and thereby preclude the ingress of seawater, silt, and mud in the case when the gyrating lever transmission is used for transmitting rotary motion through the hull of a submarine or submersible vehicle. This latter mentioned feature would obviously not be required in other environments.

*Description of the operation*

As previously described, shaft 30 has been designated the input shaft. This shaft is connected to a source of power such as an electric motor, and when rotating will rotate the crank plate 34 which will cause the end of the gyrating lever to gyrate. The spherical ball bearing joint 48 as previously described will permit gyrating motion, yet, because of the configuration of the ball bearing races indented into the surface of the enlarged spherical portion 48 and indented into the support 54, rotation of the gyrating level will be eliminated or at least limited. The right end of the gyrating lever 44 (as viewed in the drawing) will gyrate at the same magnitude and in the same direction as the left end and impart rotary motion to the right crank plate 34 and output shaft 38. Shaft 38 may be connected to any active element such as a propeller for a submarine or submersible vessel or to a control surface such as the rudder. The rubber boot or bellows 62, in sealing relationship with the right end of the gyrating level and the spherical bearing support member, by virtue of sealing ring 64, will follow the motion of the gyrating lever and preclude the transfer of fluid or foreign matter from the right side to the left side of the spherical bearing.

Although a specific embodiment has been shown and described for the purposes of illustration, it is to be understood that the invention is not restricted thereto, but that various changes and advantages will be apparent to one skilled in the art. The invention is only to be limited in accordance with the scope of the following claims.

What is claimed is:

1. In a spherical bearing joint for a gyrating lever transmission having a casing, the improvements to the spherical bearing joint comprising:
   a gyrating lever having an enlarged spherical portion intermediate the ends thereof;
   a first plurality of ball races indented in and equi-angularly spaced about the surface of said enlarged spherical portion;
   a spherical bearing support fixedly attached to the casing of said gyrating lever transmission and surrounding said enlarged spherical portion of said lever;
   a second plurality of ball races indented in said support adjacent and in registry with said ball races of said enlarged spherical portion; and
   a plurality of bearing balls cooperating with both said plurality of ball races.

2. The improvements of claim 1, wherein said plurality of ball races in the surface of said enlarged spherical portion are further defined as:
   a bow-tie configuration, the major dimensions thereof being parallel to the axis of the gyrating lever.

3. The device of claim 2, wherein said plurality of ball races in said support are further defined as:
   arcuate grooves being a segment of a circle, the chords of which are parallel to the major axis of the casing of said gyrating lever transmission.

4. The device of claim 3, wherein both said plurality of ball races are semi-toroidal and have a depth of one third the diameter of said balls.

5. The device of claim 4, wherein the spherical bearing support comprises:
   a main portion fixedly attached to the case of said gyrating lever transmission; and
   a segment ring removable attached to said main portion and containing a portion of said ball races, and spherical bore, whereby assembly of the spherical ball bearing joint is facilitated.

6. The improvements of claim 5, further comprising:
   a static seal member made of a resilient material in the form of a corrugated boot secured at one end thereof to said spherical bearing support and at the other end to said gyrating lever, whereby transmission of fluids from one side to the other of the gyrating lever transmission is precluded, and the spherical bearing is protected from foreign matter.

7. A gyrating lever transmission comprising:
   a casing having a closed end and an open end;
   an end bell for closing the open end of said casing;
   an input shaft extending through said closed end of said casing;

an output shaft extending through said end bell;

ball bearings positioned in said closed end of said casing and said end bell rotatably supporting said input and output shafts;

crank plates rigidly affixed to the ends of said input and output shafts within said casing;

ball bearings rotatably supporting said crank plates within said casing;

ball bearings mounted in the internal face of said crankplates spaced eccentrically from and at an angle to the axis of rotation of said input and output shafts;

a gyrating lever having its end supported within said ball bearings mounted in the faces of said crankplates;

an enlarged spherical portion intermediate the ends of said gyrating lever;

a first plurality of ball races indented in and equi-angularly spaced about the surface of said enlarged spherical portion;

a spherical bearing support fixedly attached to the casing and surrounding said enlarged spherical portion of said lever;

a second plurality of ball races indented in said support and in registry with said races of said enlarged spherical portion;

a plurality of bearing balls cooperating with both said plurality of ball races whereby the gyrating lever is restrained from rotation but is free to gyrate; and a corrgugated resilient boot attached in sealing relationship to said spherical bearing support and to said gyrating lever, thereby precluding transfer of fluids and foreign matter through the spherical joint.

References Cited

UNITED STATES PATENTS

| | | | |
|---|---|---|---|
| 1,731,009 | 10/1929 | King | 74—18.1 |
| 2,449,772 | 9/1948 | Gilman | 74—18.1 |
| 2,627,753 | 2/1953 | Munro | 74—18.1 |
| 1,847,677 | 3/1932 | Sternbergh. | |
| 2,283,139 | 5/1942 | Herget. | |
| 2,510,362 | 6/1950 | Anderson. | |
| 2,978,914 | 4/1961 | Gut. | |
| 2,454,340 | 11/1948 | Reichel. | |

FRED C. MATTERN, JR., *Primary Examiner.*

F. D. SHOEMAKER, *Assistant Examiner.*